United States Patent

Wolf

[11] Patent Number: 5,901,427
[45] Date of Patent: May 11, 1999

[54] METHOD OF CONSTRUCTING STUB SHAFTS FOR CONVEYOR PULLEYS

[75] Inventor: Tim E. Wolf, Pella, Iowa

[73] Assignee: Precision, Inc., Pella, Iowa

[21] Appl. No.: 08/833,577

[22] Filed: Apr. 7, 1997

[51] Int. Cl.⁶ .................................................. B23P 9/00
[52] U.S. Cl. .......................................... 29/445; 29/895.22
[58] Field of Search .............................. 29/892.1, 892.11, 29/895.2, 895.22, 445; 474/197, 903

[56] References Cited

U.S. PATENT DOCUMENTS

| | | |
|---|---|---|
| Re. 25,151 | 4/1962 | Renner . |
| 1,984,115 | 12/1934 | Cooper . |
| 2,286,152 | 6/1942 | Miller . |
| 2,452,266 | 10/1948 | Scharff ................................. 29/895.22 |
| 2,973,655 | 3/1961 | Rix . |
| 3,023,699 | 3/1962 | MacArthur . |
| 3,074,288 | 1/1963 | Newton ................................... 474/197 |
| 3,134,268 | 5/1964 | Firth . |
| 3,140,621 | 7/1964 | Stone . |
| 3,416,638 | 12/1968 | Buck ....................................... 29/895.2 |
| 4,098,137 | 7/1978 | Yaros . |
| 4,144,022 | 3/1979 | Fusco . |
| 4,344,218 | 8/1982 | Hooper et al. ......................... 29/895.22 |
| 4,563,106 | 1/1986 | Stuwe . |
| 4,600,333 | 7/1986 | Röhrig ...................................... 474/903 |
| 4,956,903 | 9/1990 | Thuries ....................................... 29/445 |
| 5,406,706 | 4/1995 | Nagai . |
| 5,548,897 | 8/1996 | Link ....................................... 29/895.22 |

OTHER PUBLICATIONS

Precision; Weld & General Note Detail, shop drawing dated Apr. 2, 1992.
Precision; Weld & General Note Detail, shop drawing dated Apr. 2, 1993.
Precision, Inc.; shop drawing dated Jul. 20, 1995.
Precision, Inc.; reference data sheet (no date); entitled "Precision Conveyor Pulleys Equipped With XT Hubs & Busings".
Precision; "HDD" Drum Conveyor Pulley brochure (no date).
Precision; "EZ Mount Mine Duty Pulley" brochure (no date).

*Primary Examiner*—David P. Bryant
*Attorney, Agent, or Firm*—Henderson & Sturm

[57] ABSTRACT

A method of constructing a stub shaft for conveyor pulleys, comprising forming an annular exterior periphery on an inward portion of a shaft member. Forming an annular ring with a complimentary interior peripheral surface having substantially the same dimensions as at least a portion of the annular exterior periphery of the shaft. Placing the annular ring over the shaft wherein the formed interior peripheral surface of the annular ring is in abutment with the formed annular exterior periphery of the shaft. Machining the inner side of the annular ring to be complementary to the outer side of the hub. Machining the exterior periphery of the inward portion of the shaft to a reduced diameter thereby forming an inwardly facing shoulder thereon flush with the machined inner side of the annular ring, and wherein the reduced diameter is substantially the same diameter as the opening in the hub. Bolting the annular ring to the hub, thereby preventing relative movement between the main shaft, the annular ring and the hub.

9 Claims, 4 Drawing Sheets

METHOD OF CONSTRUCTING STUB SHAFTS FOR CONVEYOR PULLEYS

CROSS-REFERENCE TO RELATED APPLICATIONS

This application is related to U.S. Ser. No. 08/690,502 now U.S. Pat. No. 5,759,127, a Method for Constructing a Pulley for Conveyor Belts to Allen V. Reicks, which is commonly owned by Assignee Precision Inc., and is related only because of a taper-type connection between a ring and shaft disclosed therein.

STATEMENT REGARDING FEDERALLY SPONSORED RESEARCH OR DEVELOPMENT

Not Applicable

MICROFICHE APPENDIX

Not Applicable

AUTHORIZATION PURSUANT TO 37 C.F.R. §1.71 (d) (e)

Not Applicable

BACKGROUND OF THE INVENTION

Stub shafts have been used for conveyor pulleys for a number of years, for example as shown in U.S. Pat. Nos. 2,286,152; 3,074,288; and 4,098,137. Typically these stub shafts are machined from one large cylindrical piece of steel. This is an expensive, labor intensive job which requires considerable precision because of small tolerance requirements.

Accordingly, there is a need for a quicker, cheaper, and dependable way to produce a stub shaft for conveyor pulleys.

BRIEF SUMMARY OF THE INVENTION

The present invention relates to a method of constructing a stub shaft for conveyor pulleys. These conveyor pulleys have a radial outer surface disposed about an axis of rotation for receiving and supporting a conveyor belt. Each end of the pulley has a hub with an opening therein disposed about the axis of rotation and an outer abutment surface for receiving a stub shaft.

The method of constructing the stub shaft of the present invention comprises first forming an annular tapered exterior periphery on an inner portion of a main shaft member. An annular ring is formed with a tapered interior peripheral surface with substantially the same dimensions as at least a portion of the annular tapered exterior periphery of the main shaft, this annular ring having a hub abutment side and an outer side. The annular ring is forced onto the main shaft to a position wherein the tapered interior peripheral surface of the annular ring is in abutment with the annular tapered exterior periphery of the main shaft. Once in this position, a machining process is used to remove the inner side of the annular ring and cause it to be complementary to the outer side of the hub. Also, the exterior periphery of the inner portion of the main shaft is machined to a reduced diameter less than the diameter of any portion of the tapered surface thereof. This forms an inwardly facing shoulder thereon. The reduced diameter is substantially the same diameter as the opening in the hub whereby the stub shaft can be connected to the hub such that the outer abutment surface of the hub is in abutment with the inner side of the annular ring, with the inwardly facing shoulder of the main shaft preventing relative movement between the main shaft, the annular ring and the hub. In a preferred embodiment, openings are provided through the annular ring and threaded openings are provided through the hub. Bolts are then inserted to hold the ring and hub securely together.

An object of the present invention is to provide an improved method of constructing a stub shaft for conveyor pulleys.

Another object of the present invention is to provide a method of constructing a stub shaft for conveyor pulleys which is quicker, cheaper and just as dependable as forming a stub shaft out of a single piece of material.

Other objects, advantages, and novel features of the present invention will become apparent from the following detailed description of the invention when considered in conjunction with the accompanying drawings.

DETAILED DESCRIPTION OF THE INVENTION

Figure 1:
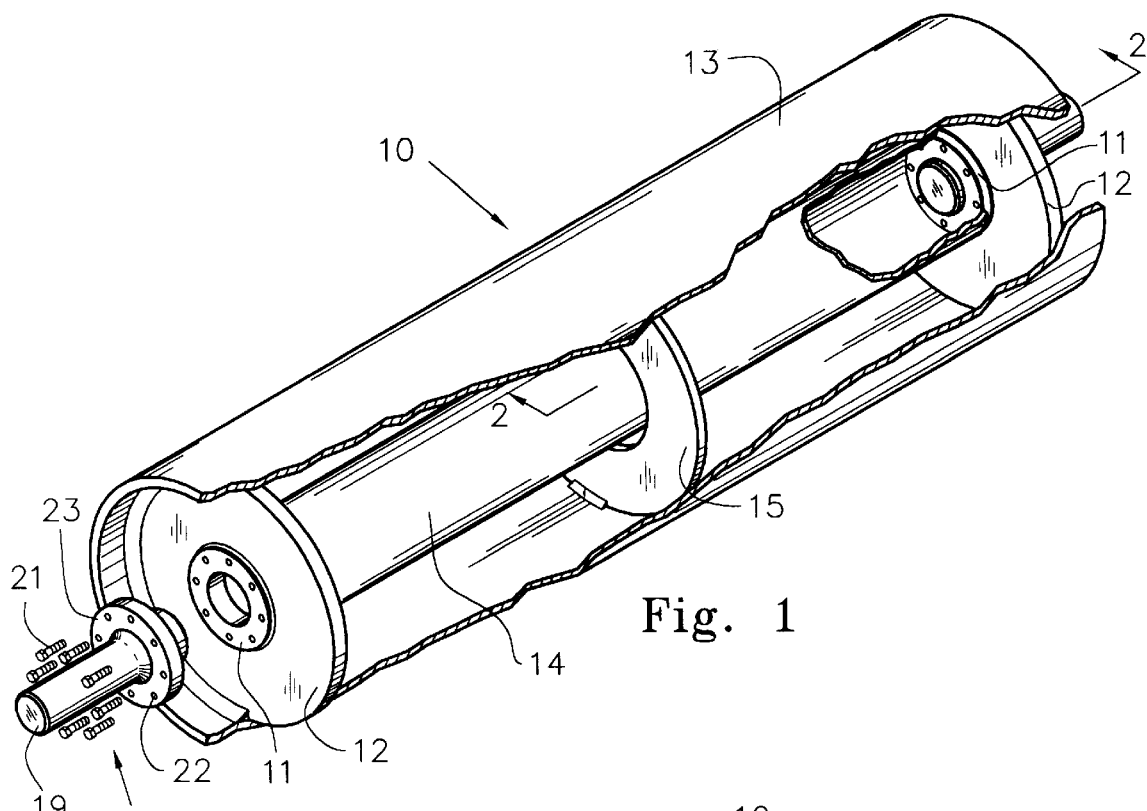
FIG. 1 is a perspective view of a conveyor pulley utilizing a stub shaft constructed in accordance with the present invention.

Referring now to the drawings wherein like reference numerals designate identical or corresponding parts throughout the several views, FIG. 1 shows a conveyor pulley (10) constructed in accordance with the present invention and having a hub (11) disposed on each end of end plates (12), which are welded to the cylinder (13) of the pulley (10). An interior reinforcing tube (14) and internal ring (15) provide more structural integrity to the pulley (10) and are welded to the pulley as shown by the welds of FIG. 2.

Figure 2:
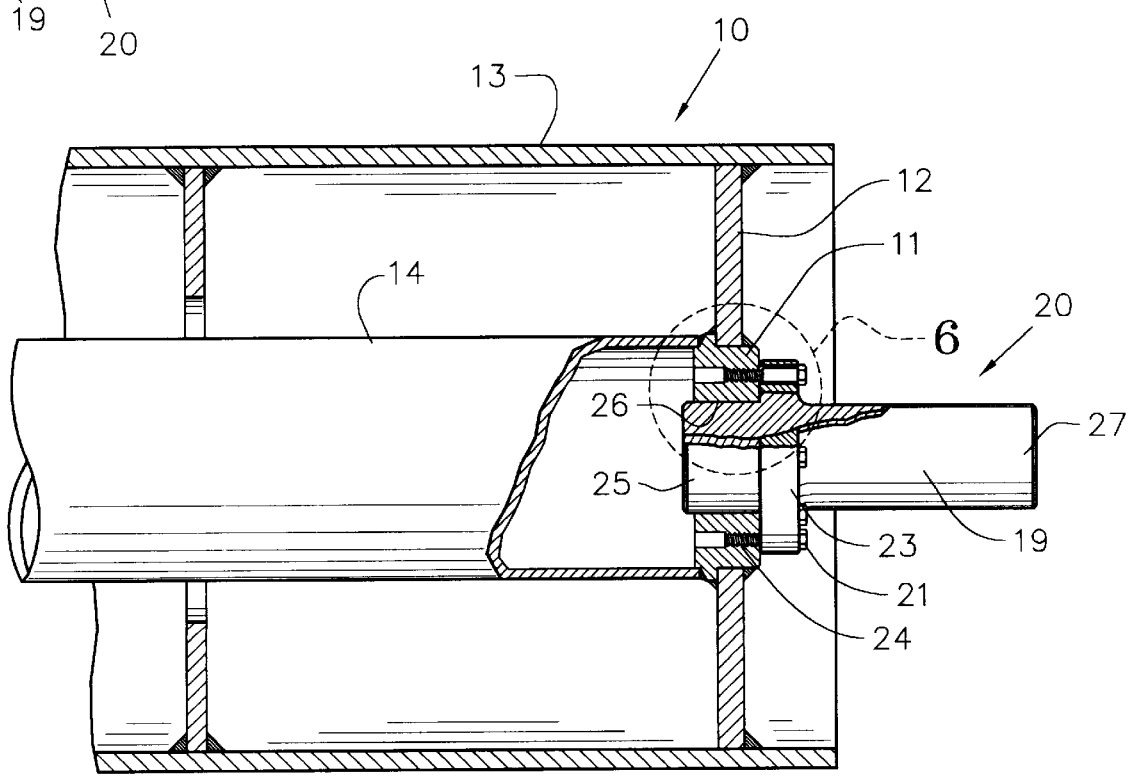
FIG. 2 is an enlarged partial cross sectional view taken along line 2—2 of FIG. 1.

FIG. 2 shows the stub shaft (20) constructed in accordance with the present invention. Stub shaft (20) is connected to the hub (11) by bolts (21) which extend through openings (22) in the annular ring (23) and are threaded into threaded openings (24) in the hub (11). An inner shaft portion (25) of the stub shaft (20) fits tightly within the opening (26) of the hub (11). Outer shaft portion (27) is provided for rotating in a bearing type mounting (not shown)

and can, if necessary, be extended with a key or the like (not shown) to provide a way to rotate the pulley (10).

Figure 3:
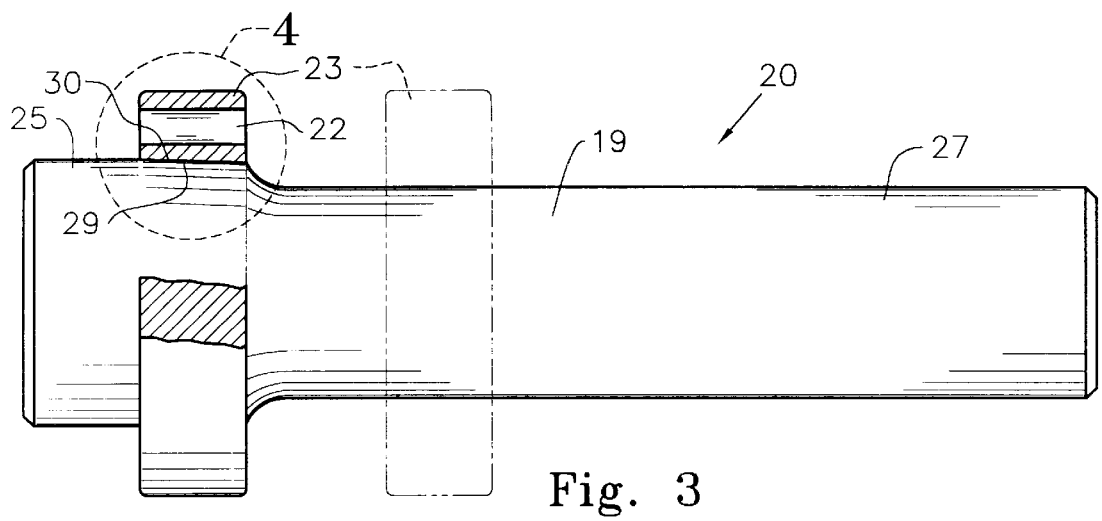
FIG. 3 is a side elevational view of the stub shaft showing a cross sectional view of an annular ring which forms one of two pieces of the stub shaft and also shows the annular ring in dashed lines before it is placed on the main shaft.
Figure 4:
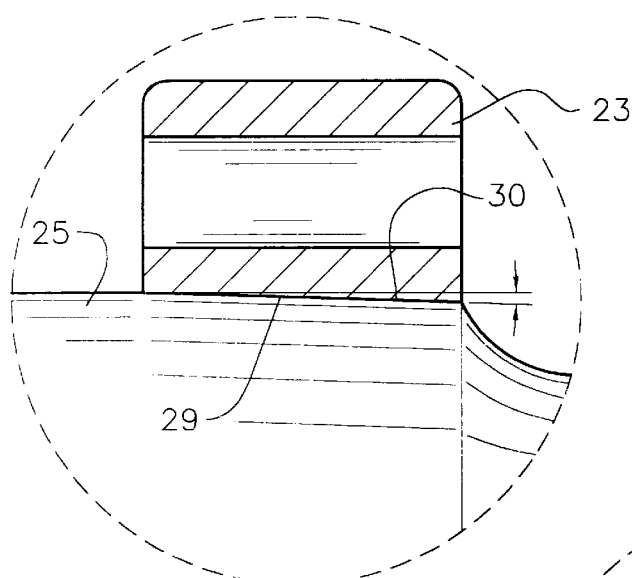
FIG. 4 is an enlarged view of the circled portion of FIG. 3 and showing the tapered surface of the main shaft and a complementary tapered surface on the annular ring shown in cross section.

Instead of constructing a stub shaft having a flange from a single piece of steel or the like, it has been determined that a stub shaft can be more cheaply and just as effectively made by using a two-piece construction. As shown in FIG. 3, the two-piece construction includes an annular ring (23) and a main shaft portion (19) which includes cylindrical inner and outer shaft portions (25) and (27) respectively, and an intermediate tapered portion (29). The inner periphery (30) of the annular member (23) has a taper which is complementary to the taper (29) between cylindrical shaft portions (25) and (27) of the main shaft (19). This tapered relationship is enlarged so that it can be seen more clearly in FIG. 4.

Figure 5:
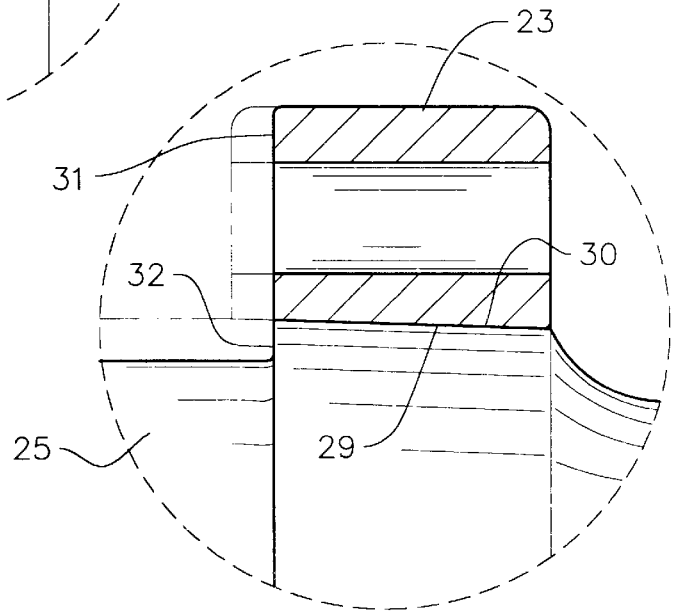
FIG. 5 is a view like FIG. 4 but showing in dashed lines the portion which is machined away to form a final construction of the stub shaft.
Figure 6:
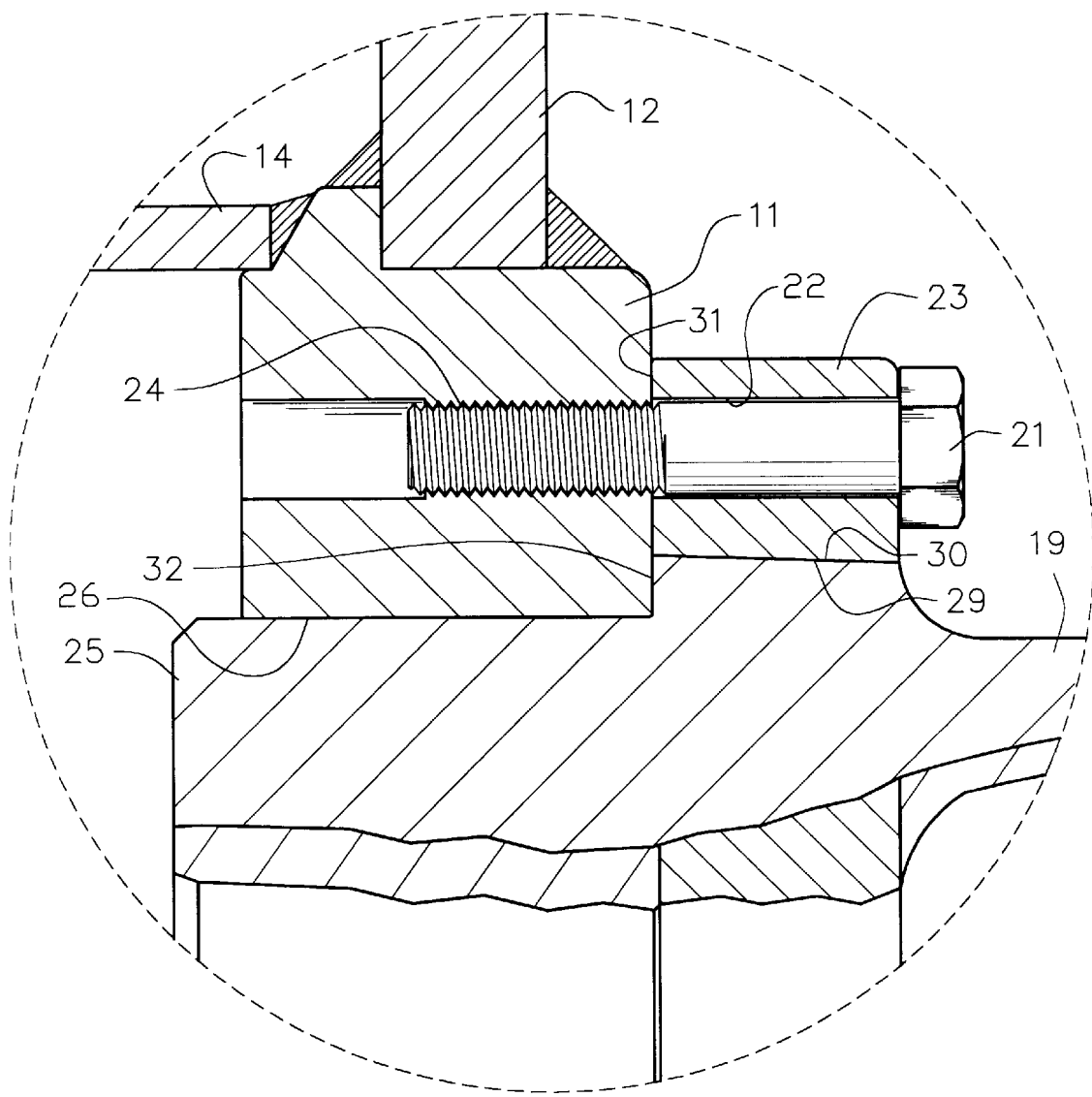
FIG. 6 is an enlarged view of the circled portion in FIG. 2 and showing the stub shaft in its final position connected to the hub of the conveyor pulley.

After forming the annular ring (23) and main shaft portion (19), the main shaft (19) is inserted through the annular ring (23) as illustrated in FIG. 3. The annular ring (23) (represented in dashed lines) is then forced or shrunk onto the intermediate tapered portion (29) of main shaft (19) as shown in solid lines in FIG. 3. Once in the final position, shown in FIGS. 3 and 4, the stub shaft (20) is machined along the abutment surface (31) of the annular ring (23). Machining is also done on the inner shaft portion (25) of the main shaft (19) to form a shoulder (32) by reducing the overall diameter of the inner shaft portion (25) as shown in FIG. 5. The removed portions of annular ring (23) and inner shaft portion (25) from the machining process are represented in dashed lines in FIG. 5. By performing the machining function, the abutment surface (31) is exactly flush with the shoulder (32). This allows the annular ring (23) to fit tightly and snugly in abutment with the exterior flat surface of the hub (11) as shown in detail in FIGS. 2 and 6. Once the structure is completely bolted together as shown in FIGS. 2 and 6, it will be appreciated that the hub (11) prevents the main shaft (19) from moving to the left. This is primarily because of the abutment of shoulder (32) against the hub (11). Additionally, the tapered surfaces (29) on the main shaft (19) and (30) on the annular ring (23) prevents the shaft from moving to the right, since the annular ring (23) is bolted to the hub (11) and the tapered relationship prevents any movement of the main shaft (19) to the right as can best be seen by viewing FIG. 6.

Figure 7:
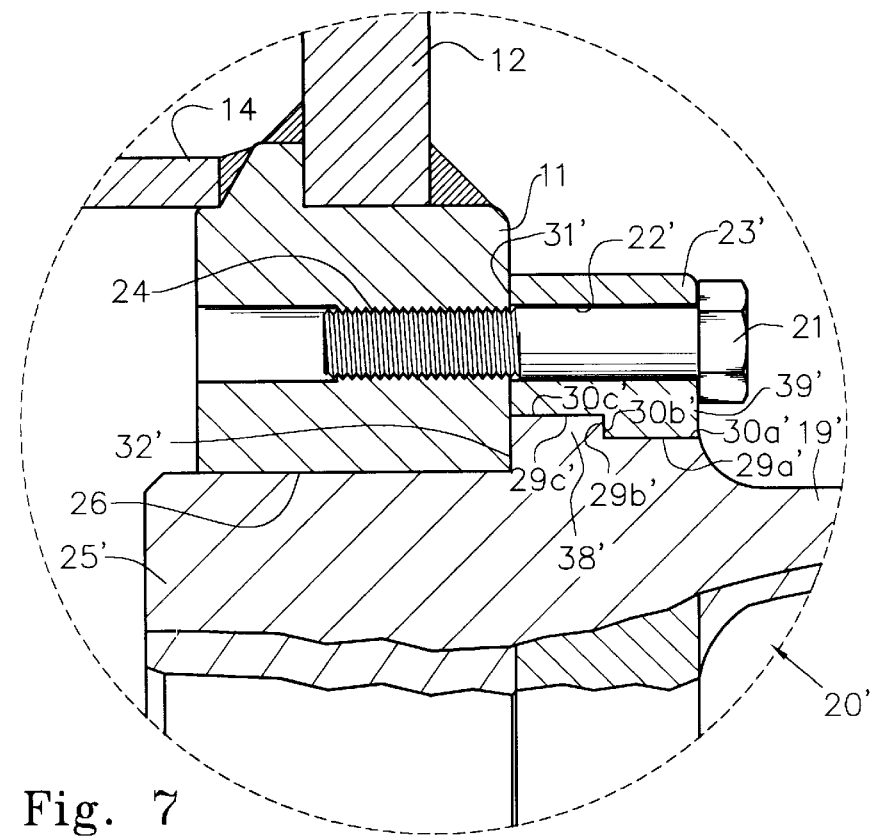
FIG. 7 is an enlarged view like FIG. 6 but showing an alternate embodiment.

In an alternative construction to that just described, FIG. 7 shows the stub shaft (20') constructed in accordance with the present invention. Stub shaft (20') is connected to the hub (11) by bolts (21) which extend through openings (22') in the annular ring (23') and are threaded into threaded openings (24) in the hub (11). An inner shaft portion (25') of the stub shaft (20') fits tightly within the opening (26) of the hub (11).

Instead of constructing the stub shaft shown in FIG. 3 and FIG. 6, the two-piece construction illustrated in FIG. 7 includes an annular ring (23') and a main shaft portion (19') which includes cylindrical inner shaft portions (25'), and an intermediate portion (29a', 29b', and 29c'). The inner periphery (30a', 30b', and 30c') of the annular member (23') has a configuration which is complementary to the configuration (29a', 29b', and 29c') between cylindrical shaft portion (25') of the main shaft (19').

After forming the annular ring (23') and main shaft portion (19'), the main shaft (19') is inserted through the annular ring (23') as illustrated in FIG. 7. The annular ring (23') is then forced onto the intermediate portions (29a', 29b', and 29c') of main shaft (19') as shown in FIG. 7. Once in the final position, and similar to the views shown in FIGS. 3 and 4, the stub shaft (20') is machined along the abutment surface (31') of the annular ring (23'). Machining is also done on the inner shaft portion (25') of the main shaft (19') to form a shoulder (32') by reducing the overall diameter of the inner shaft portion (25') as shown in FIG. 7. The removed portions of annular ring (23') and inner shaft portion (25') from the machining process is similar to that shown in dashed lines in FIG. 5. By performing the machining function, the abutment surface (31') is exactly flush with the shoulder (32'). This allows the annular ring (23') to fit tightly and snugly in abutment with the exterior flat surface of the hub (11) as shown in detail in FIG. 7. Once the structure is completely bolted together as shown in FIG. 7, it will be appreciated that the hub (11) prevents the main shaft (19') from moving to the left. This is primarily because of the abutment of shoulder (32') against the hub (11). Additionally, the surfaces (29a', 29b', and 29c') on the main shaft (19') and (30a', 30b', and 30c') on the annular ring (23') prevents the shaft from moving to the right, since the annular ring (23') is bolted to the hub (11) and this abutting relationship prevents any movement of the main shaft (19') to the right as can clearly be seen by viewing FIG. 7. This creates a compression of stub shaft annular ring (38') between part (39') of outer ring (23') and the outer surface of hub (11) where it abuts shoulder (32').

Figure 8:
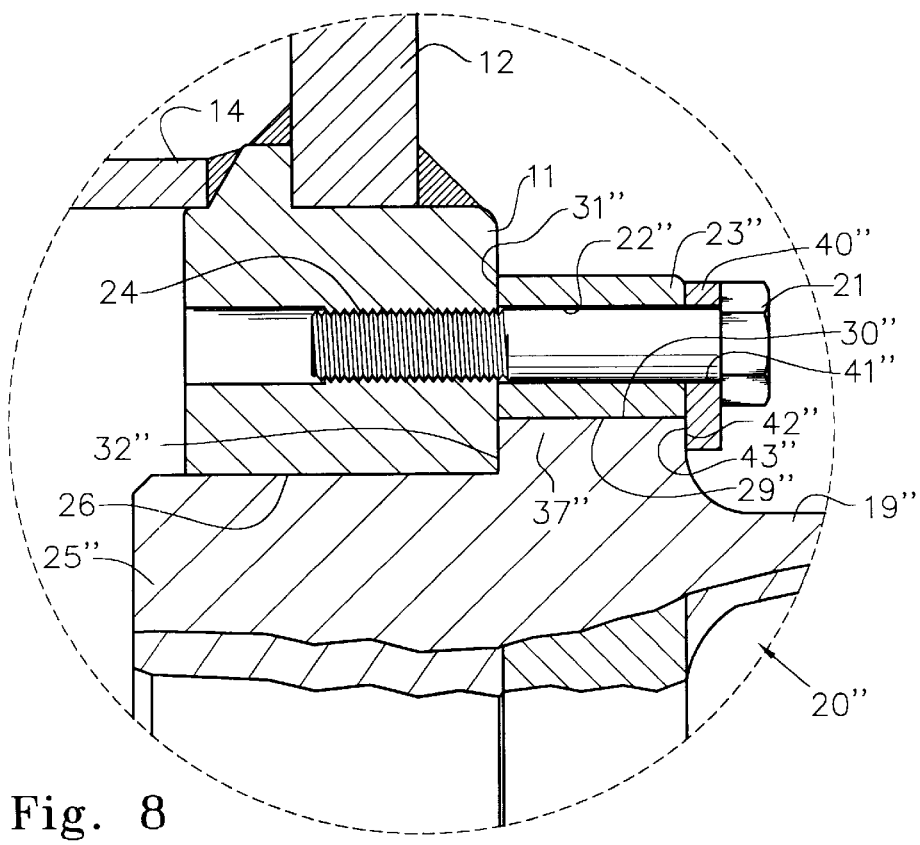
FIG. 8 is a view like FIGS. 6 and 7 but showing a still different embodiment.

Another alternative two-piece construction of the stub shaft is illustrated in FIG. 8. FIG. 8 shows the stub shaft (20") constructed in accordance with the present invention. Stub shaft (20") is connected to the hub (11) by bolts (21) which extend through openings (22") in the annular ring (23") and are threaded into threaded openings (24) in the hub (11). An inner shaft portion (25") of the stub shaft (20") fits tightly within the opening (26) of the hub (11).

Instead of constructing the stub shaft shown in FIG. 3 and FIG. 6 or FIG. 7, the two-piece construction includes an annular ring (23") and a main shaft portion (19") which includes cylindrical inner shaft portion (25"), and an intermediate portion (29"). The inner periphery (30") of the annular member (23") has a constant diameter configuration which is complementary to the configuration of constant diameter portion (29") between cylindrical shaft portion (25") of the main shaft (19").

After forming the annular ring (23") and main shaft portion (19"), the main shaft (19") is inserted through the annular ring (23") as illustrated in FIG. 8. The annular ring (23") is then placed onto the intermediate portion (29") of main shaft (19") as shown in FIG. 8. Once in the final position, and similar to the views shown in FIGS. 3 and 4, the stub shaft (20") is machined along the abutment surface (31") of the annular ring (23"). Machining is also done on the inner shaft portion (25") of the main shaft (19") to form a shoulder (32") by reducing the overall diameter of the inner shaft portion (25") as shown in FIG. 8. The removed portions of annular ring (23") and inner shaft portion (25") from the machining process is similar to that shown in dashed lines in FIG. 5. By performing the machining function, the abutment surface (31") is exactly flush with the shoulder (32"). This allows the annular ring (23") to fit tightly and snugly in abutment with the exterior flat surface of the hub (11) as shown in detail in FIG. 8. Once the structure is completely bolted together as shown in FIG. 8, it will be appreciated that the hub (11) prevents the main shaft (19") from moving to the left. This is primarily because of the abutment of shoulder (32") against the hub (11). Additionally, part (42") of member (40") is pulled against surface (43") of the main shaft (19") which pushes the annular ring (23") to the left and prevents the shaft (19") from moving to the right, since the annular ring (23") is bolted to the hub (11) and this abutting relationship prevents any movement of the main shaft (19") to the right as can clearly be seen by viewing FIG. 8. This traps annular ring portion ring (37") of stub shaft (19") between retaining ring (40") and hub (11) at shoulder (32").

Accordingly, it will be appreciated that the preferred method disclosed herein does indeed accomplish the aforementioned objects. Obviously many modifications and variations of the present invention are possible in light of the above teachings. It is therefore to be understood that, within the scope of the appended claims, the invention may be practiced otherwise than as specifically described.

What is claimed is:

1. A method of constructing a stub shaft for a conveyor pulley of a type which has a radial outer surface disposed about an axis of rotation for receiving a conveyor belt, each end of the pulley having a hub with an opening therein disposed about the axis and an outer abutment surface for receiving a shaft, said method comprising:

(a) forming an annular tapered exterior periphery on an inner portion of said shaft, a larger diametered part of said tapered exterior periphery being inward and a smaller diametered part of the tapered exterior periphery being outward from the larger diametered part;

(b) forming an annular ring with a tapered interior peripheral surface with substantially the same dimensions as at least a portion of the annular tapered exterior periphery of the shaft, said annular ring having a hub abutment side and an outer side;

(c) forcing the annular ring onto the shaft to a position wherein the tapered interior peripheral surface of the annular ring is in abutment with the annular tapered exterior periphery of the shaft;

(d) forming the inner side of the annular ring to be complementary to the outer side of the hub; and (e) forming the exterior periphery of the inner portion of the shaft to a reduced diameter less than the diameter of any portion of the tapered surface thereof to form an inwardly facing shoulder thereon, said reduced diameter being substantially the same diameter as the opening in the hub whereby the shaft formed thereby can be connected to said hub such that the outer abutment surface of the hub is in abutment with the inner side of the annular ring and with the inwardly facing shoulder of the shaft thereby preventing relative axial movement between the shaft, the annular ring and the hub.

2. The method of claim 1 including forming openings in said annular ring along axes disposed radially outwardly from the axis of rotation for permitting the ring to be bolted to the hub.

3. The method of claim 1 including:

(f) forming a pattern of holes in the hub around the axis;

(g) forming a pattern of matching holes in the annular ring which match with the pattern of holes in the hub; and (h) placing fasteners through respective matching holes in the ring and hub to hold the ring and hub securely together.

4. The method of claim 1 wherein said step (d) of forming the inner side of the annular ring is done by a machining process.

5. The method of claim 1 wherein said step (e) of forming the exterior periphery of the inner portion of the stub shaft to a reduced diameter is done by a machining process.

6. A method of constructing a stub shaft for a conveyor pulley of a type which has a radial outer surface disposed about an axis of rotation for receiving a conveyor belt, each end of the pulley having a hub with an opening therein disposed about the axis and an outer abutment surface for receiving a shaft, said method comprising:

(a) forming an annular exterior periphery on an inner portion of said shaft;

(b) forming an annular ring with a interior peripheral surface with substantially the same dimensions as at least a portion of the annular exterior periphery of the shaft, said annular ring having a hub abutment side and an outer side;

(c) placing the annular ring onto the shaft to a position wherein the interior peripheral surface of the annular ring is in contact with the annular exterior periphery of the shaft;

(d) forming the inner side of the annular ring to be complementary to the outer side of the hub;

(e) forming the exterior periphery of the inner portion of the shaft to a reduced diameter less than the diameter of any portion of the surface of the annular exterior periphery of the shaft to form an inwardly facing shoulder thereon, said reduced diameter being substantially the same diameter as the opening in the hub; and (f) connecting the hub, the annular ring and the shaft together such that the outer abutment surface of the hub is in abutment with the inner side of the annular ring and with the inwardly facing shoulder of the shaft thereby preventing relative axial movement between the shaft, the annular ring and the hub.

7. The method of claim 6 wherein said step (a) includes forming a larger diameter part and a smaller diameter part in said exterior periphery, said larger diameter part being inward and said smaller diameter part being outward from the larger diameter part thereby creating a step.

8. The method of claim 6 wherein said step (a) includes forming an exterior periphery of a substantially constant diameter.

9. The method of claim 6 wherein said step (a) includes forming an exterior periphery having a taper, the larger diameter part of said tapered exterior periphery being inward and the smaller diameter part of said tapered exterior periphery being outward from the larger diametered part.

* * * * *